Patented Nov. 12, 1940

2,221,340

UNITED STATES PATENT OFFICE 2,221,340

PROCESS FOR THE SEPARATION OF DIHYDRO-EQUILIN AND ESTRADIOL

Arthur Serini, Berlin, and Willy Logemann, Berlin-Charlottenburg, Germany, assignors to Schering Corporation, Bloomfield, N. J., a corporation of New Jersey No Drawing. Application April 23, 1938, Serial No. 203,822. In Germany April 30, 1937

15 Claims. (Cl. 260—397)

This invention relates to a process for the separation of dihydro-equilin and estradiol.

From the urine of pregnant mares Girard and co-workers have isolated together with estrone further estrogenous active substances such as equilin and equilenin. Girard was able to show that at the commencement of the pregnancy chiefly estrone appeared, whereas in the further course of gestation the quantity of the more highly unsaturated compounds, the dehydrogenation products of estrone, increases so that towards the end of the pregnancy the equilenin is present in large quantity in the urine. Since the equilenin possesses a stronger acid character than the other compounds it can be relatively easily separated therefrom, whereas the separation of estrone and equilin meets with great difficulties.

In accordance with the present invention a process is provided by which this separation can be effected with extreme ease.

According to the process of the invention the estrone-equilin mixture is converted by known methods, for example with sodium and alcohol, into the corresponding diols. From this diol mixture, by means of saponins, for example digitonin, only the estradiol, in fact the trans-estradiol, is precipitated. In the mother liquor of the digitonin precipitation there is contained chiefly the dihydro-equilin together with a little cis-estradiol which can easily be removed by crystallisation.

This separation is technically of the greatest importance since the equilin and its derivatives are physiologically less active than estrone and its compounds.

The following example illustrates the invention.

Example.—0,5 gram of estrone-equilin mixture is reduced at 100° C. in propyl alcoholic solution with sodium. After reduction, precipitation with water is carried out and the product filtered. The dried precipitate (0,5 gram) is dissolved in 10 ccs. of 95% ethyl alcohol and treated at boiling temperature with a solution of 2,5 grams of digitonin in 50 ccs. of 90% ethyl alcohol. After a relatively short time a thick precipitate separates; this is filtered after a few hours and washed with a large volume of ether.

The filtered digitonide is for the purpose of resolution into digitonin and trans-estradiol dissolved in a little warm pyridine and after cooling the digitonin precipitated with a large volume of ether.

The whole is filtered and the ether washed several times with dilute sulphuric acid and finally with water. The ether is dried with magnesium sulphate and evaporated; the residue is recrystallised from dilute methanol.

There is obtained the pure trans-estradiol of M. P. 175° C. The mother liquor from the precipitated digitonide is treated with ether in order to precipitate the excess of digitonin. The product is filtered and the filtrate washed several times with water. After drying of the ethereal solution it is evaporated and the residue recrystallised from dilute methanol. The pure dihydro-equilin of M. P. 175° C. is obtained.

Instead of carrying out the reaction with digitonin in aqueous 90% alcoholic solution it is also possible to employ alcohol of other concentration or also other alcohols or even other aqueous organic solvents miscible with water. It is also possible to add the saponin in finely divided form to the reaction mixture without previously dissolving it. Obviously in this case it is necessary to stir the reaction mixture strongly. The best results are however obtained when, corresponding to the above example, a solution of the starting material is employed and the saponin added in alcoholic solution. Instead of precipitating the saponide from the reaction mixture by long standing the solution can also be partly or completely evaporated to dryness, whereby in the first case the precipitation of the saponide is facilitated, whereas in the second case the dry evaporation residue is separated into the saponide and the other constituents by extraction with a solvent which is capable only of extracting the other constituents of the reaction mixture but not the saponide. For this purpose for example, ether is suitable but also other suitable solvents can be employed for the same purpose.

A further method of separation of the saponide from the reaction mixture consists in the precipitation of the saponide by dilution of the reaction mixture with a suitable liquid which is capable of precipitating the saponide. Water is suitable for example as precipitating agent for this purpose.

The splitting up of the saponide can also be carried out by treatment with other solvents than pyridine; thus other pyridines, other heterocyclic bases and also xylene or other high boiling liquids and the like can be used. The decomposition of the saponide can also be effected by heating with organic acid anhydrides, for example with acetic anhydride, whereby in the extraction of the decomposition mixture with ether or the like the corresponding ester of the hydroxy compound is obtained.

Digitonin has proved to be a particularly outstanding agent for the separation of the trans-estradiol, but also other saponins can be used for this purpose, as for example solamine, cyclamine, dioscine and the like.

The reduction of the estrone-equilin mixture to the corresponding diols can also be effected by other means than with sodium and alcohol; there are suitable for this purpose all such reduction methods in which only the keto-groups of the starting materials are reduced to the secondary alcohol groups, but in which however the double bonds in the molecule remain essentially unattacked.

Having now particularly described and ascertained the nature of our said invention and in what manner the same is to be performed, we declare that what we claim is:

1. Process for the separation of dihydro-equilin and estradiol from mixtures containing the same wherein the said mixtures are caused to react with saponins and the products which have not entered into reaction with the saponin and the saponin compounds of the products which have entered into reaction therewith are separated, whereupon by splitting of the saponin compounds the substances which combined with the saponin are isolated.

2. Process as claimed in claim 1 in which the reaction with saponin is carried out in solution.

3. Process as claimed in claim 1 in which the saponin compound is separated from the reaction solution by precipitation.

4. Process as claimed in claim 1 in which the solution of the reaction product is brought to dryness and the dry residue treated with solvents in which the saponide-containing portion is insoluble.

5. Process as claimed in claim 1 in which the saponin is digitonin.

6. Process as claimed in claim 1 in which as starting material the estradiol-dihydro-equilin mixture is employed as is obtained by reduction of an estrone-equilin mixture.

7. Process as claimed in claim 1 in which the starting material is prepared by partially hydrogenating an estrone-equilin mixture which has been isolated from the urine of animals of the genus Equidae.

8. Process as claimed in claim 1 in which the decomposition of the saponide takes place by heating with a high boiling organic liquid.

9. Process as claimed in claim 1 in which the decomposition of the saponide takes place by treatment with a heterocyclic base.

10. Process as claimed in claim 1 in which the reaction with the saponin takes place in alcoholic solution.

11. Process as claimed in claim 1 in which from the reaction mixture obtained after separation of the saponide the dihydro-equilin is isolated.

12. Process as claimed in claim 1 in which by decomposition of the saponide the trans-estradiol is isolated.

13. Process for the separation of dihydro-equilin and estradiol from a liquid mixture containing the same, which comprises reacting the mixture with a saponin to produce the saponide of the estradiol and causing the precipitation of such saponide, separating the saponide from the liquid, splitting the saponide and recovering the estradiol.

14. Process according to claim 13 wherein the saponin is digitonin.

15. Process for the separation of estrone and equilin from each other in the form of their dihydro compounds, which comprises partially hydrogenating a mixture containing estrone and equilin to the dihydro forms with the aid of sodium and an alcohol, adding water to the reaction mixture to cause precipitation of the hydrogenation products, dissolving the precipitate and reacting the solution with digitonin, separating the precipitate, reacting the same with pyridine, and recovering the freed estradiol.

ARTHUR SERINI.
WILLY LOGEMANN.